United States Patent [19]
Albertson

[11] 3,709,512
[45] Jan. 9, 1973

[54] SNOWMOBILE STABILIZING DEVICE

[76] Inventor: Robert V. Albertson, 2100 Shady Wood Road, Minneapolis, Minn.

[22] Filed: Oct. 26, 1970

[21] Appl. No.: 83,716

[52] U.S. Cl. .................................. 280/28, 180/5 R
[51] Int. Cl. ............................................ B62m 27/00
[58] Field of Search........ 180/5 R; 280/12 R, 12 A, 12 AA, 280/8, 16, 28

[56] References Cited

UNITED STATES PATENTS

| | | | |
|---|---|---|---|
| 3,593,814 | 7/1971 | Bauler | 280/28 X |
| 487,990 | 12/1892 | Chittick | 280/8 |
| 3,404,745 | 10/1968 | Smieja | 180/5 R |
| 3,504,921 | 4/1970 | Osmond | 280/8 |
| 2,093,229 | 9/1937 | Bowman | 180/5 A |

FOREIGN PATENTS OR APPLICATIONS

| | | | |
|---|---|---|---|
| 41,569 | 6/1925 | Norway | 280/16 |

OTHER PUBLICATIONS

Sno-Sled Stabilizer Manufacturing Company, Catalog Sheet, "Sled-Ski Stabilizer", received July 1, 1969.
Snowmobiles Specialities, Inc. Catalog, p. 6, "Sled-Ski Stabilizer", received May 21, 1971,

*Primary Examiner*—Kenneth H. Betts
*Assistant Examiner*—Robert R. Song
*Attorney*—Alfred E. Hall

[57] ABSTRACT

A stabilizer device adapted to be removably mounted on the skis of a snowmobile type vehicle for providing stability on ice or hard packed snow is described. The stabilizer comprises a steel wheel mounted for rotation on one end of an axle, the other end of the axle adapted to be inserted into a tubular bracket mounted at the ski. A cotter pin or other similar device holds the axle in the bracket in normal use, but permits the wheel assembly to be removed completely or replaced on the other edge of the ski.

5 Claims, 1 Drawing Figure

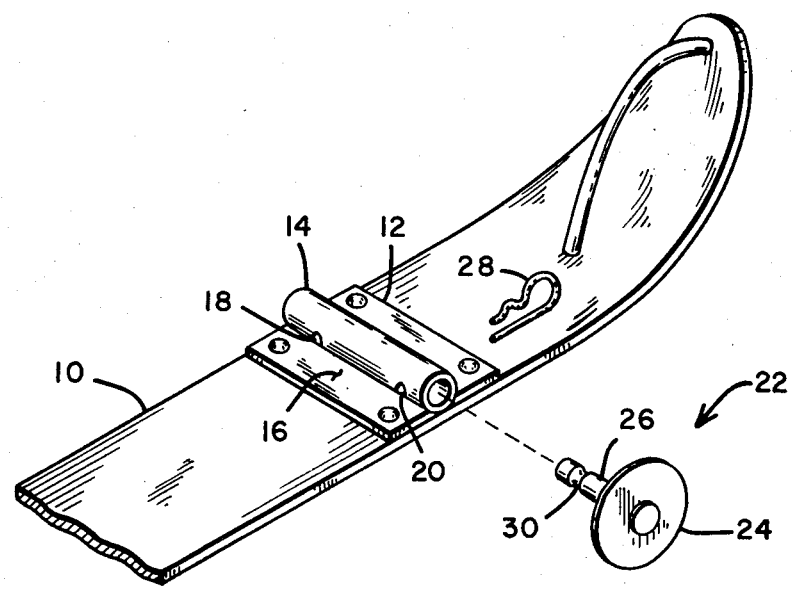

SNOWMOBILE STABILIZING DEVICE

BACKGROUND OF THE INVENTION

This invention relates generally to a stabilizer device for a snowmobile and more specifically to an improved arrangement which facilitates the removal, reversal or replacement of the device.

When snowmobiles are operating on ice or packed snow, the vehicle may skid or slide when an attempt is made to turn it. It has been found that this tendency to skid can be eliminated or greatly reduced by attaching a small wheel to one or both skis on the vehicle such that the wheels extend beyond the edge of the skis and engage the ground. The wheel rotates in the direction of travel of the vehicle but digs into ice or hard packed snow to resist any sideways movement and thereby provides complete steering control even on ice and compacted snow.

In accordance with the teachings of this invention, the stabilizer wheel is mounted on one end of a cylindrical axle. A cylindrical bracket having a length approximately the same as the width of the snowmobile ski and a diameter slightly larger than the diameter of the axle is fastened to the upper side of the ski. When the axle is inserted into the bracket, the wheels extends beyond the edge of the ski and engages the surface over which the vehicle moves. The wheel and axle assembly can be fastened to the bracket by means of a cotter pin or the like to facilitate removal or reassembly on the other side of the ski.

It is accordingly an object of this invention to provide a stabilizer device for a snowmobile to prevent skidding of the vehicle while turning on ice or compacted snow.

Another object of this invention is to provide a snowmobile ski stabilizer wheel assembly that can be readily attached to operate on either the inside edge or the outside edge of the ski.

These and other objects of the invention will become apparent to those skilled in the art upon the reading of the following detailed description and the accompanying drawing which illustrates a preferred embodiment of the invention.

Referring now to the drawing there is shown a ski 10 of the type used on the front end of a snowmobile. Mounted on the ski 10 by rivets or bolts is a bracket 12 having a tubular portion 14 secured to or integrally formed with a flat plate portion 16. Located on the tubular portion 14 are a pair of holes 18 and 20 which extend through the portion 14 in a direction transverse to the axis of the tube.

Also shown in the drawing is a wheel assembly indicated generally by numeral 22 which includes a wheel member 24 mounted for rotation on an axle 26. The diameter of axle 26 is only slightly less than that of the tubular portion 14 and is adapted to fit within the tubular portion 14. Because the bracket 12 is of the same length as the width of ski 10 the wheel assembly 22 can be inserted in either end of portion 14 so as to function on either the inside edge or the outside edge of the ski 10.

The wheel assembly may be locked to the bracket by inserting a cotter pin or bolt through the aperture 18 or 20, depending upon which edge of the ski the wheel is to cooperate. Alternatively, the wheel 24 may be attached to the axle 26 so that the wheel and axle rotate as a unit and then the axle is inserted into the bracket 12 which then serves as a bearing. When using this technique rather than ball bearings between the wheel 24 and axle 26, a spring type key 28 may be inserted through the aperture 18 or 20 to cooperate with a circumferential groove formed in the axle 26. The clip 28 permits the axle 26 to rotate within tubular portion 14, but locks the wheel assembly 22 from sliding out of the bracket.

In operation, the stabilizer of this invention can be affixed to either or both skis of a snowmobile on either the inside or outside edge thereof. The wheels extend below the bottom surface of the ski and dig into the snow or ice to resist any sideways motion, i.e., skidding, of the vehicle when an attempt is made to turn the vehicle.

While a preferred embodiment of the invention has been illustrated and described, variations thereof will become apparent to those skilled in the art and, hence, the scope of the invention is to be determined from the appended claims.

What is claimed is:

1. A stabilizer attachment for a snowmobile comprising:
   a. a bracket permanently affixed to the top surface of a snowmobile ski, said bracket carrying a tubular portion lying transverse to said ski and having an orifice therein,
   b. a wheel assembly comprising an axle having a wheel rotatably mounted at one end thereof and a groove thereon adapted to be aligned with said orifice when said axle is inserted in said tubular portion, and
   c. locking means for passing through said orifice and engaging said groove whereby said axle is held within said tubular portion.

2. A stabilizer attachment as in claim 1 wherein said tubular portion is integrally formed with said bracket.

3. A stabilizer attachment as in claim 1 wherein said grove extends about the circumference of said axle.

4. A stabilizer attachment as in claim 1 wherein said locking means comprises a spring type key removable inserted in said orifice.

5. A stabilizer attachment as in claim 1 wherein said orifice is located at both ends of said tubular portion whereby said wheel assembly may be mounted on either side of said ski.

* * * * *